E. B. RODMAN.
BOX OR BAG GRAB.
APPLICATION FILED MAR. 15, 1913.

1,082,446.

Patented Dec. 23, 1913.

Witnesses

Inventor
E. B. Rodman
By Victor J. Evans.
Attorney

UNITED STATES PATENT OFFICE.

EZRA B. RODMAN, OF JACKSON, MISSISSIPPI.

BOX OR BAG GRAB.

1,082,446.  Specification of Letters Patent.  Patented Dec. 23, 1913.

Application filed March 15, 1913. Serial No. 754,424.

*To all whom it may concern:*

Be it known that I, EZRA B. RODMAN, a citizen of the United States, residing at Jackson, in the county of Hinds and State of Mississippi, have invented new and useful Improvements in Box or Bag Grabs, of which the following is a specification.

This invention relates to box or bag grabs.

One of the principal objects of the invention is the provision of a device of this character which will be more convenient to handle and which will not tear or mar the bag or box being handled like the ordinary bale hook.

With the ordinary type of bale hook having a single prong the shank has to be placed between the middle and ring fingers which is of itself extremely inconvenient. Furthermore, this type of hook tears the burlap on the bales and mars packing boxes considerably. For this reason many articles are shipped with the legend "Use no hooks."

It is the object of this invention to avoid these difficulties and broadly speaking consists in a double shank hook having a connecting bar between the shanks which is provided with short penetrating teeth.

Further objects of the invention will appear as the following description is read in connection with the accompanying drawing which forms a part of this application, and in which:—

Figure 1:
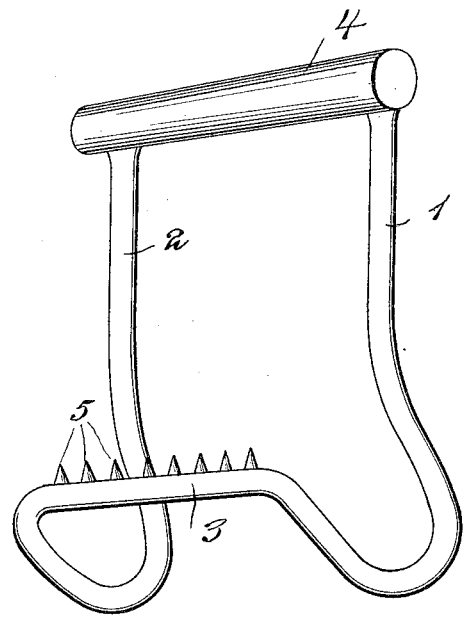
Figure 2:
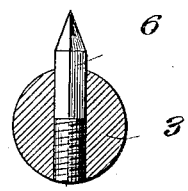

Figure 1 is a perspective view of the device. Fig. 2 is a detail sectional view showing the modified form.

In the specific embodiment of the invention, as illustrated herein, the device comprises separate shanks 1 and 2 which are connected together at their outer ends by a yoke bar 3 and at their inner ends by a handle 4, the shanks being connected to the outer ends of the yoke bar and to the outer ends of the handle, as shown. This permits the hand of the operator to engage the handle between the shanks without separating any of the fingers like in the use of the ordinary bale hook.

Both shanks 1 and 2 are formed on a curve, as shown in Fig. 1, so as to offset the yoke bar and in Fig. 1 the yoke bar is provided with a plurality of integral teeth 5 which are adapted to penetrate the bale or box, such penetration being limited by the yoke bar itself.

In Fig. 2 the yoke bar is shown as provided with removable teeth 6 which are held in place in the yoke bar by screw threads.

What is claimed is:—

1. An article of the class described comprising a pair of separated shanks arranged in parallel relation and having offset ends, a yoke bar connecting the offset ends of the shanks, a handle connecting the opposite ends of the shanks and holding them in separated relation and a plurality of penetrating teeth projecting forwardly from the yoke bar.

2. An article of the class described comprising a handle, shanks secured to the opposite ends of the handle and arranged in parallel relation, a yoke bar connecting the opposite ends of the shanks and having a plurality of penetrating teeth, said shanks and yoke bar being offset with relation to the handle.

In testimony whereof I affix my signature in presence of two witnesses.

EZRA B. RODMAN.

Witnesses:
J. L. SKINNER,
Mrs. J. H. PINIX.

Copies of this patent may be obtained for five cents each, by addressing the "Commissioner of Patents, Washington, D. C."